A. WILFORD.
GRAIN SEPARATOR.
APPLICATION FILED NOV. 29, 1916.

1,237,004.

Patented Aug. 14, 1917.
3 SHEETS—SHEET 3.

Inventor
Albert Wilford
By
Attorney

UNITED STATES PATENT OFFICE.

ALBERT WILFORD, OF BALTIMORE, MARYLAND.

GRAIN-SEPARATOR.

1,237,004.  Specification of Letters Patent.  Patented Aug. 14, 1917.

Application filed November 29, 1916. Serial No. 134,162.

*To all whom it may concern:*

Be it known that I, ALBERT WILFORD, a citizen of the United States, residing at Baltimore, in the State of Maryland, have invented certain new and useful Improvements in Grain-Separators, of which the following is a specification.

The present invention relates to means for separating different kinds of grain, which for one reason or another, may have become mixed in bulk.

The object of the invention is to provide a relatively simple and inexpensive apparatus that will very effectively separate the grain and deliver the same at different points, said apparatus including mechanism for extracting dirt, chaff and other like materials.

An embodiment of the invention that is at present considered the preferable one, is illustrated in the accompanying drawings, wherein:—

Figure 1 is a side elevation of the machine,

Fig. 2 is an end elevation thereof,

Figure 5:
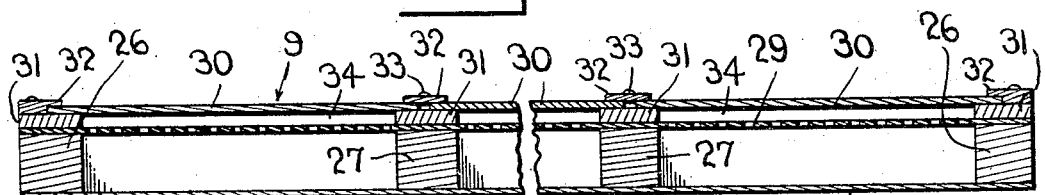

Fig. 5 is a cross sectional view, and

Figure 1:
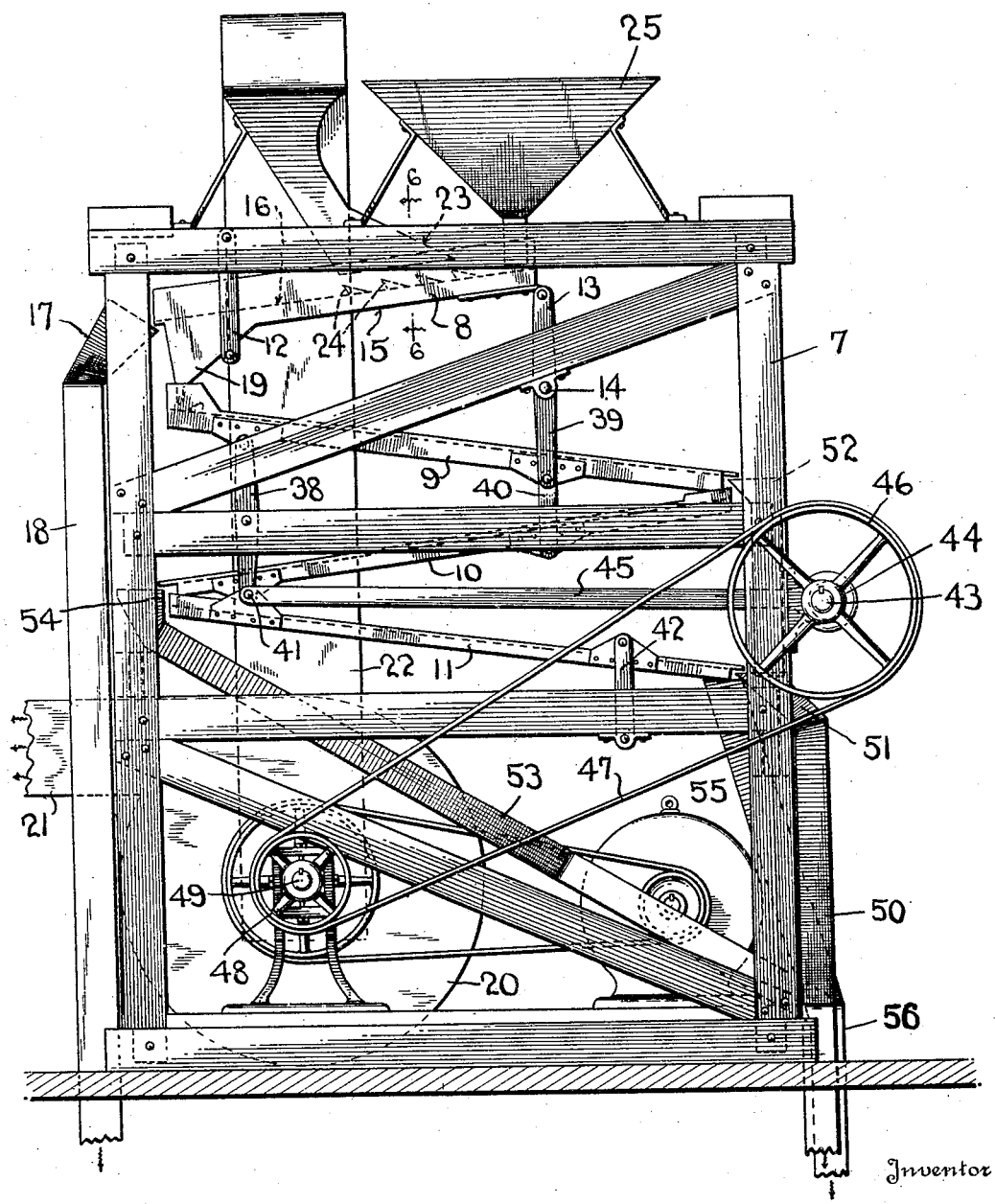
Figure 6:
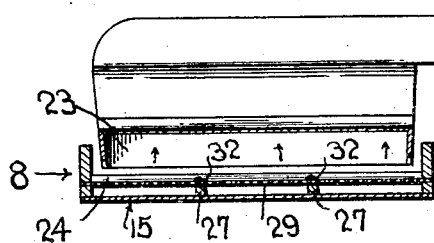

Fig. 6 is a detail sectional view taken substantially on the line 6—6 of Fig. 1.

Similar reference numerals designate corresponding parts in all the figures of the drawings.

In the embodiment illustrated, a supporting frame 7 is provided, which may be of any desired character. Within this frame are mounted a plurality of separating shoes which are respectively designated 8, 9, 10 and 11. It will be noted that these shoes are alternately inclined in opposite directions, the lower end of one being disposed over the upper end of the next beneath.

The uppermost shoe 8 has its lower end supported by links 12, while its upper end is supported upon the upper ends of levers 13 fulcrumed between their ends upon the frame 7, as shown at 14. This shoe has an imperforate bottom 15 and a screen 16 therein that will permit the passage therethrough of small grain but prevent the passage of larger grain. For example it will allow wheat, oats and the like to fall through upon the bottom 15, whereas corn will pass over the screen and will discharge into the receiving mouth 17 of a vertical chute 18 delivering to any desired point. The shoe 8 has a downwardly inclined delivery spout 19 discharging upon the upper end of the next shoe 9.

Figure 2:
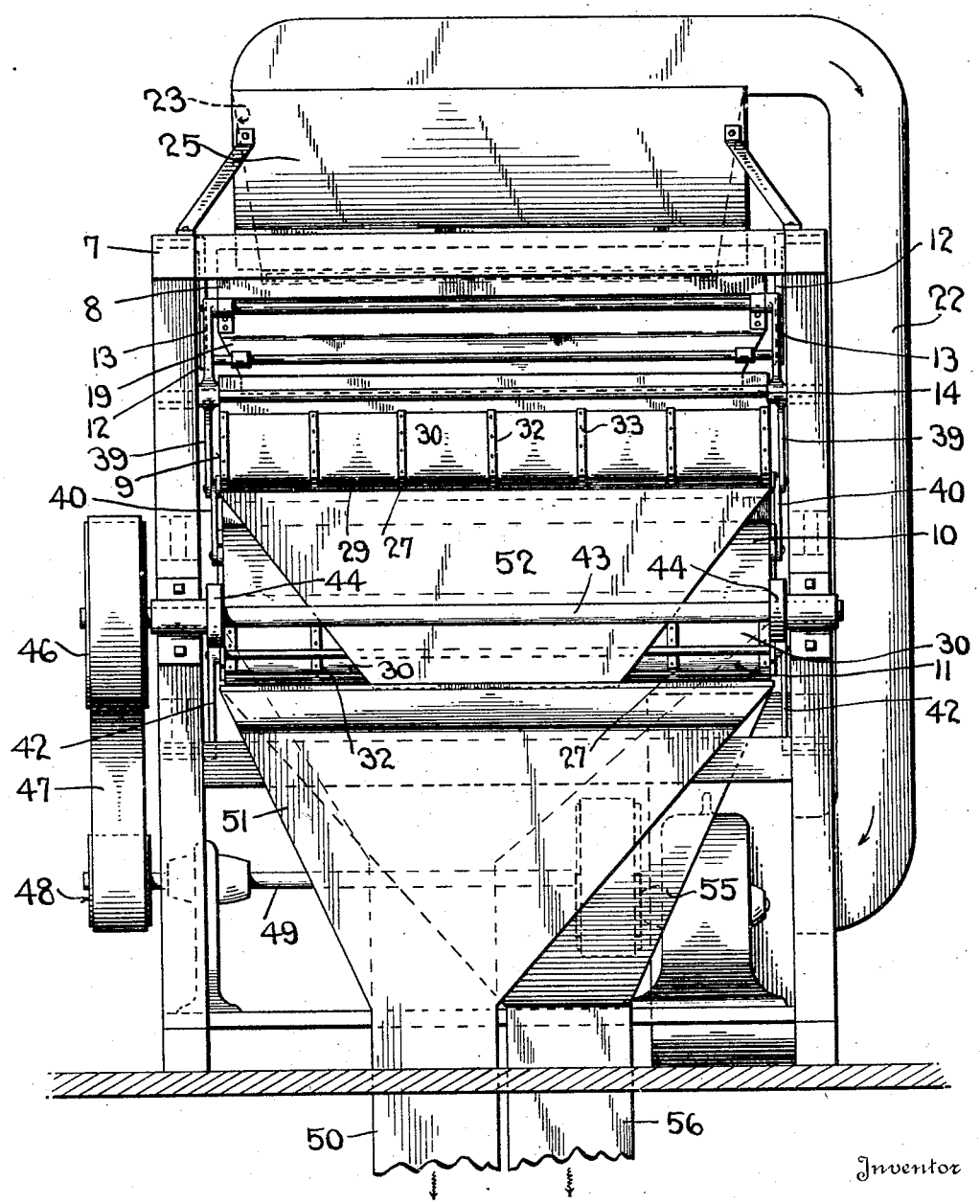

Mounted in the base portion of the frame, is a suitable fan 20 having a discharge trunk 21 and an intake trunk 22, the latter trunk extending upwardly alongside the frame and over the same as will be clear by reference to Figs. 1 and 2. This portion overlying the frame, has a depending intake mouth 23 extending the width of the shoe 8 and projecting into the same above the screen 16. Upon this screen and directly beneath the mouth 23 are a plurality of transversely arranged agitator bars 24. A suitable feeding hopper 25 is mounted upon the supporting frame 7 and discharges into the upper end of the shoe 8.

Figure 3:
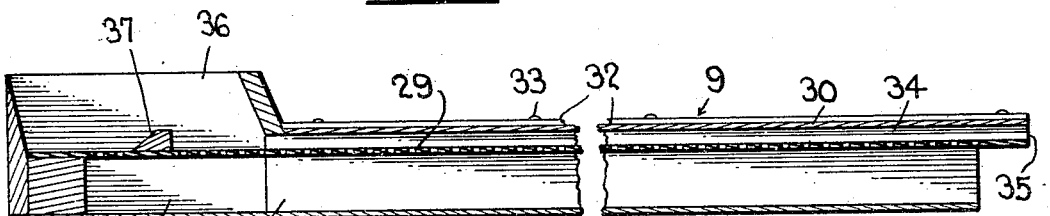
Fig. 3 is a vertical longitudinal sectional view through one of the separating shoes.
Figure 4:
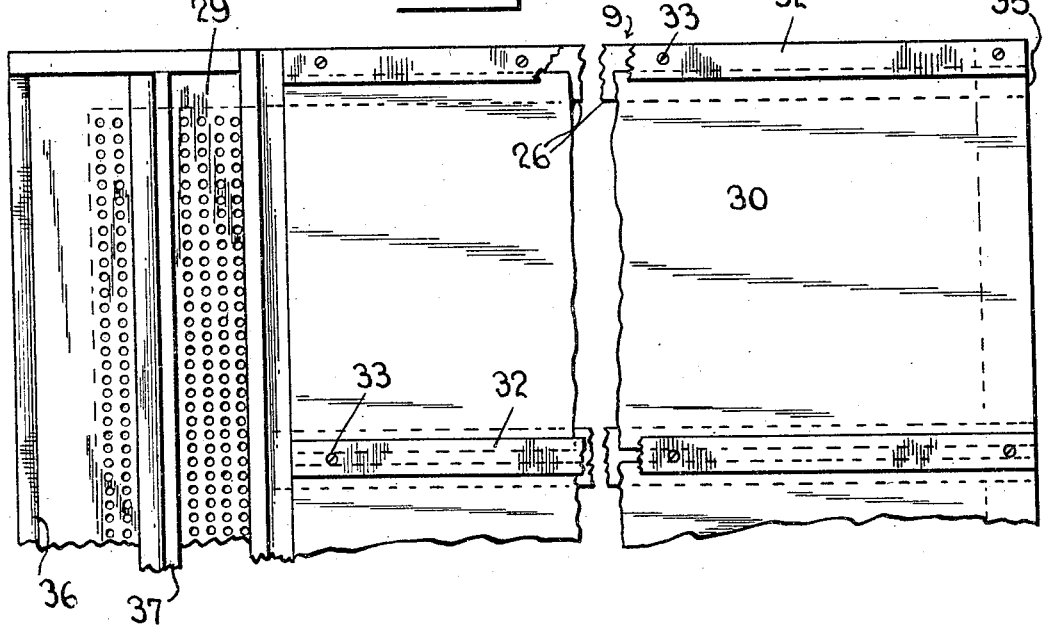
Fig. 4 is a plan view of a portion of the same.

The other shoes 9, 10 and 11 are alike in construction, and a description of one is believed to be sufficient for all. One of these shoes is illustrated in detail in Figs. 3, 4 and 5. As shown, it consists of a frame having sides 26 and a plurality of intermediate longitudinally disposed reinforcing bars 27. An imperforate bottom 28 is secured to the under side of the sides 26 and reinforcing bars 27, and located upon said sides and reinforcing bars is a perforate plate or screen 29. The openings in this screen will permit the passage therethrough of wheat, for example, but are too small to allow oats to pass therethrough unless these oats are tilted sufficiently to enter the openings endwise. Such tilting is, however, prevented by a cover located over the screen 29, the cover consisting of sections 30 located upon strips 31 forming parts of the sides and reinforcing bars. These covers are detachable, and are held in place by overlying strips 32 and suitable fasteners 33. It will be understood that the space 34 formed between the screen and cover will permit the passage therethrough of both wheat and oats, but this space is too narrow to permit the oats to turn on end, so that they will pass over the screen and discharge from the lower end thereof at 35 in Fig. 3. The upper end of each shoe is provided with an inlet guide or boxing 36, in which is placed a retarder bar 37 and the inlet portion of one shoe is disposed below the discharge end of the bottom of the shoe above it, while the discharge end 35 of the screen projects beyond the bottom, as will be clear by reference to Fig. 3.

As shown in Fig. 1, the upper shoe 9 has its receiving end located beneath the discharge hopper 19 of the shoe 8. This shoe 9 has its upper end pivotally supported on the upper ends of levers 38, while its lower portion is suspended from the lower arms 39 of the levers 13. The next shoe 10 has its upper portion suspended from links 40 that are carried by the shoe 9, while its lower end has a pivotal connection 41 with the lower ends of the levers 38. The lowermost shoe 11 has its upper end supported by the same pivot 41 and the lower arms of the levers 38, while its lower end is supported on links 42.

A driving shaft 43 is journaled upon one end of the frame and is provided with eccentrics 44 on which are mounted pitmen 45, these pitmen having connections with the pivot 41. The shaft also carries a driving pulley 46 having a belt connection 47 with a pulley 48 of the fan shaft 49. It will thus be seen that when the shaft 43 is operated, the fan will be driven while the pitmen 45 will give a shaking motion to all the shoes through the various lever connections 38 and 39.

As already explained, the oats which do not pass through the screens of the shoes 9, 10 and 11 will discharge from the lower ends of said shoes. This separated grain is brought to a common point of discharge. For that purpose, there is provided a vertical chute 50 which is located on the opposite end of the frame to the chute 18, the said chute having an intake mouth 51 located at the discharge end of the screen of the shoe 11. Discharging into this mouth is a hopper 52 located directly above the mouth and receiving the grain from the screen of the shoe 9. Another chute 53 extends across the frame and delivers into the chute 50. This chute 51 has an inlet hopper or mouth 54 located to receive the grain from the screen of the shoe 10. The material which has passed through all the screens and consequently is upon the bottom of the lowermost shoe 11, discharges from said shoe into the receiving hopper 55 of a chute 56 that is located alongside the chute 50.

The operation of the structure is substantially as follows. Assuming that the driving shaft 43 is in operation, and the shoes and fan are consequently in action, it will be evident that if mixed grain is deposited in the hopper 25, it will enter the uppermost shoe 8. Passing through this shoe, the corn, for example, will remain upon the screen 16, and be delivered into the chute 18, while the wheat and oats will pass through on to the bottom 15 and thus be discharged into the upper end of the shoe 9. As this material passes through the shoe 8, it will be subjected to an agitating action particularly beneath the intake end 23 of the trunk 22. The strong current of air will therefore extract dirt, dust, chaff and the like. The grain, as for instance, oats and wheat, entering the shoe 9, will be delivered on to the screen 29 thereof. The wheat will readily pass through this screen, while most of the oats will pass thereover, and will be delivered to the hopper 52. However, some oats will probably pass through the screen with the wheat, and this will be delivered to the second shoe 10. Here a second separating action will take place, and any oats separated from the wheat will be discharged into the hopper 52 of the chute 53, said chute as already explained, delivering into the chute 50. The wheat will in turn be delivered to the lowermost shoe 11 where a third separating action will take place, and any oats separated in the shoe 11 will be delivered to the chute 50, while the extracted wheat will find its way into the chute 56.

By having the cover sections 30 of the screen in sections, a number of advantages are obtained. In the first place smaller, and therefore more inexpensive strips of sheet metal can be utilized than if a single sheet extended over the entire top. Furthermore it permits the removal of any one section for the purpose of cleaning the portion of the screen beneath the same should obstructions occur. Then, again, by having the cover of sections the fastening devices 33 can be passed between the sections into the underlying strips 31.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new and desire to secure by Letters Patent, is:—

1. In a grain separator, the combination with a frame, of oppositely inclined shaking shoes therein, said shoes having separating means, means for delivering one character of material from one shoe to the other, means for delivering from the lower end of each shoe material of a different character, a chute located at one end of the frame for receiving the latter character of material from one shoe, and a chute receiving the latter character of material from the other shoe, said last mentioned chute extending across the frame and delivering to the first mentioned shoe.

2. In a grain separator, the combination with a supporting frame, of a plurality of oppositely inclined shaking shoes located therein, means for shaking said shoes, the lower end of one shoe delivering to the upper end of the next adjacent shoe material of one character, separating screens in said shoes for delivering from the lower end of each material of a different character, an upright chute located at one end of the frame and having mouths for receiving the material discharged from the lower ends of the shoes inclined downwardly toward said chute, and a chute extending across the frame and delivering into the first mentioned chute, said chute having a mouth for receiving material from the oppositely inclined screen.

3. In a grain separator, the combination with a support, of an upstanding lever fulcrumed between its ends on the support, an upper shoe mounted on the upper end of the lever, and a pair of lower shoes both mounted on the lower end of the lever at their adjacent ends.

4. In a grain separator, the combination with a support, of an upstanding lever fulcrumed between its ends on the support, an upper inclined shoe having its upper end mounted on the upper end of the lever, and a pair of reversely inclined lower shoes having their adjacent ends both mounted on the lower end of the lever at their adjacent ends.

5. In a grain separator, the combination with a support, of an upstanding lever fulcrumed between its ends on the support, an upper inclined shoe having its upper end mounted on the upper end of the lever, a pair of reversely inclined lower shoes having their adjacent ends both supported from the lower end of the lever, and shaking means having a link connection with said lever.

6. In a grain separator, the combination with a support, of a shaking separator shoe therein, comprising a frame having sides and reinforcing bars between the sides parallel thereto to permit the passage of grain longitudinally of said sides, a bottom secured to the frame, a screen spaced from the bottom and mounted on the sides and reinforcing bars, an imperforate top comprising separately removable sections spaced from the screen and respectively bridging the spaces between the sides and reinforcing bars, and means comprising clamps overlapping the adjacent edges of the sections and detachably securing the sections to the respective sides and reinforcing bars and permitting the independent removal of said sections.

In testimony whereof, I affix my signature in the presence of two witnesses.

ALBERT WILFORD.

Witnesses:
R. LEGARE WEBB,
CHARLES W. MULLIGAN.

Copies of this patent may be obtained for five cents each, by addressing the "Commissioner of Patents, Washington, D. C."